Feb. 23, 1960  G. F. SHARPLES  2,925,968
AIRCRAFT UNDERCARRIAGES
Filed March 4, 1957  3 Sheets-Sheet 3

United States Patent Office 2,925,968
Patented Feb. 23, 1960

2,925,968

AIRCRAFT UNDERCARRIAGES

Geoffrey Francis Sharples, St. Annes-on-Sea, England, assignor to The English Electric Company Limited, Kingsway, London, England, a company of Great Britain Application March 4, 1957, Serial No. 643,854

Claims priority, application Great Britain March 29, 1956

1 Claim. (Cl. 244—102)

The invention relates to undercarriages for aircraft having thin wings into which the undercarriages have to be retracted. An important problem then arising is the accommodation in the wing of tyres having sufficient load carrying capacity and of wheels having sufficient braking energy absorption for the aircraft concerned. This problem cannot be solved usually with the use of single wheels, and multiple wheel arrangements have often to be resorted to.

One type of multiple wheel arrangement is the well known tandem arrangement which, however, presents difficulties in attaining a small turning radius for the aircraft on the ground while avoiding sideways scrubbing on the ground.

Another type of multiple wheel arrangement with the wheel arranged co-axially conflicted hitherto with the first mentioned requirement of accommodating the undercarriages in a thin wing.

The invention provides a multiple wheel arrangement which combines the advantages of a co-axial wheel arrangement on the ground with those of a tandem arrangement in the retracted condition while avoiding the aforesaid disadvantages of both.

According to the invention one wheel of a side-by-side twin wheel arrangement is journalled on the undercarriage leg proper, while the other wheel is journalled on an auxiliary structure pivoted to the said aircraft leg which structure is locked to the said leg on the ground in a position in which the two wheels are co-axial, and in the retracted condition of the undercarriage is swung about the said leg into a position required for the accommodation of the said undercarriage in a space of minimum depth, for example substantially in a tandem-like position.

As the said auxiliary structure has to carry the wheel journalled on it only in the unloaded condition, it can be comparatively light. The locking means securing this wheel in the side-by-side position have, however, to transmit the landing load and brake torque to the undercarriage leg.

In order that the invention may be clearly understood and readily carried into effect, an embodiment thereof will now be described by way of example with reference to the accompanying drawings in which.

Figure 1:
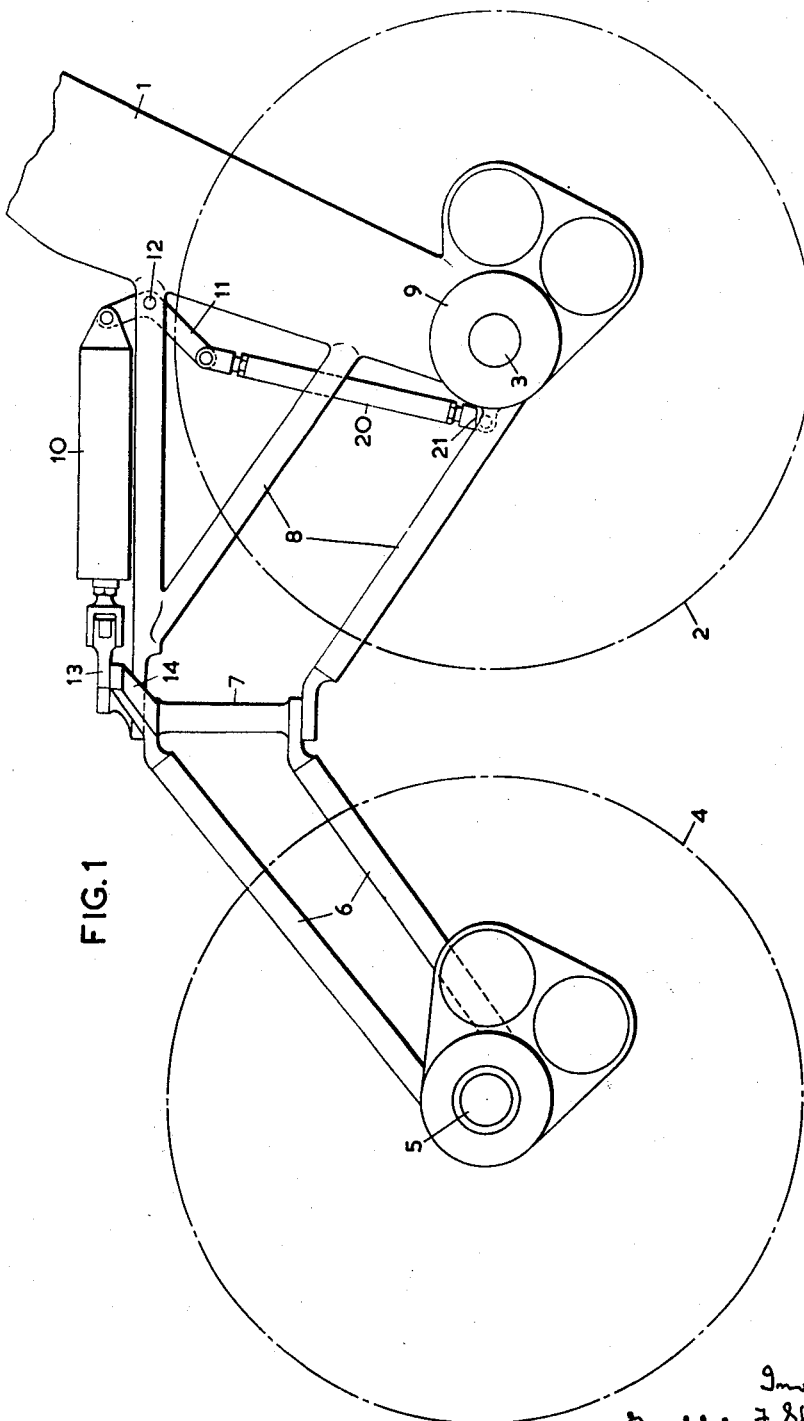
Fig. 1 shows the new wheel arrangement in lateral elevation lowered in a tandem-like position.

One wheel 2, of two wheels 2, 4, is journalled on an axle 3 fixed at the end of an undercarriage leg 1. The other wheel 4 is journalled on a stub axle 5 which is carried on a light arm structure 6 pivoted about a jury pivot axle 7 carried by an outrigger 8 fixedly attached to the undercarriage leg 1.

An operating jack 10 is articulated at one end to a bell crank lever 11 pivoted to the undercarriage leg 1 at 12, and at the other end to a toggle lever mechanism 13 engaging a lever 14, centered on the said jury pivot axle 7, and a lug 15 of the said outrigger 8.

Figure 3:
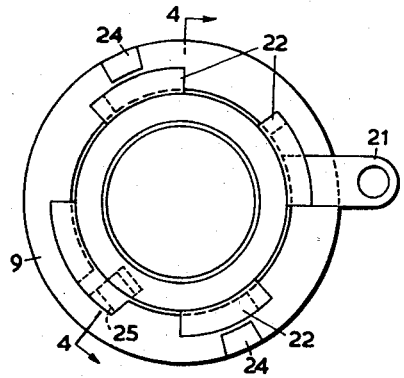
Fig. 3 is a detail of the locking mechanism in lateral elevation as seen from the opposite side of Fig. 1.
Figure 4:
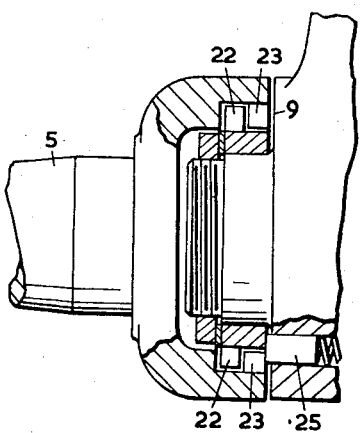
Fig. 4 is a part section on the line 4—4 of Fig. 3, in the locked position.

The said bell crank lever 11 is articulated through a connecting rod 20 to a lever 21 fixedly connected to a locking mechanism (Figs. 3, 4) which is substantially of the kind of a dog clutch or bayonet joint having segments 22 adapted to interengage with segments 23 of stub axle 5, and to lock said stub axle to face 9 of the undercarriage leg 1. Torque reacting lugs 24 transmit the braking torque from the wheel 4 to the leg 1. A spring loaded latch 25 is let into the face 9, which is pressed in as the segments 23 on the stub axle 5 enter the lock, allowing the lock to rotate and to secure the stub axle 5 to the face 9 of the leg 1.

Figure 2:
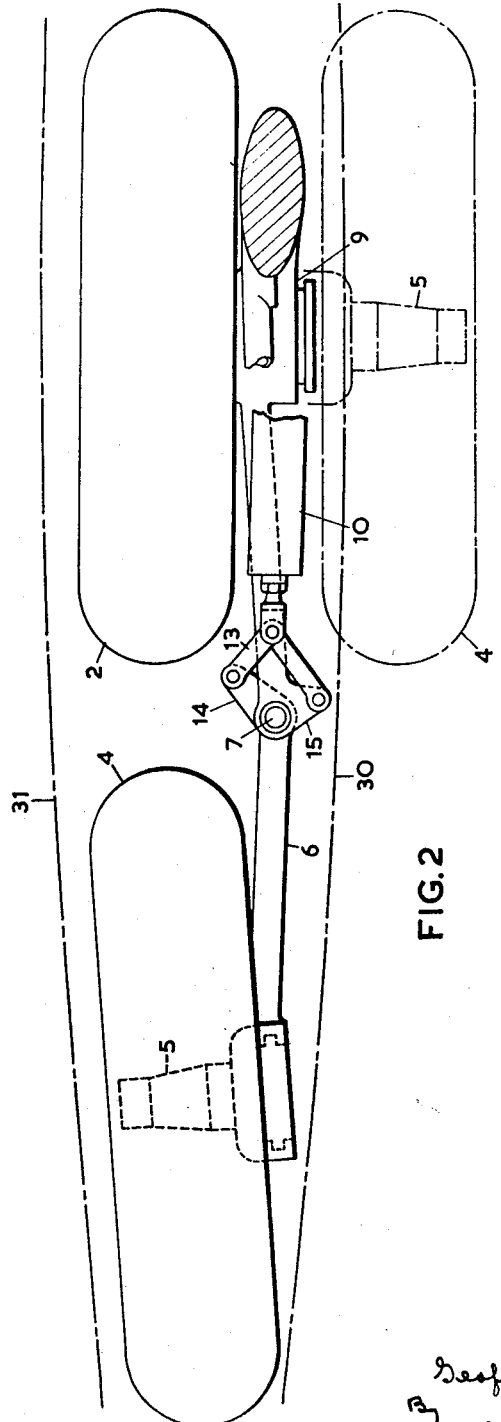
Fig. 2 is an elevation in the retracted position showing the second wheel in the tandem-like position in full lines and also in the co-axial position in chain dotted lines.

The lower surface contour 30 and top surface contour 31 of the wing are indicated in Fig. 2, and it will be seen that the two wheels 2 and 4 and their auxiliary structure 6, 8 are accommodated between these two contours, when the two wheels are in a tandem-like position.

Figure 5:
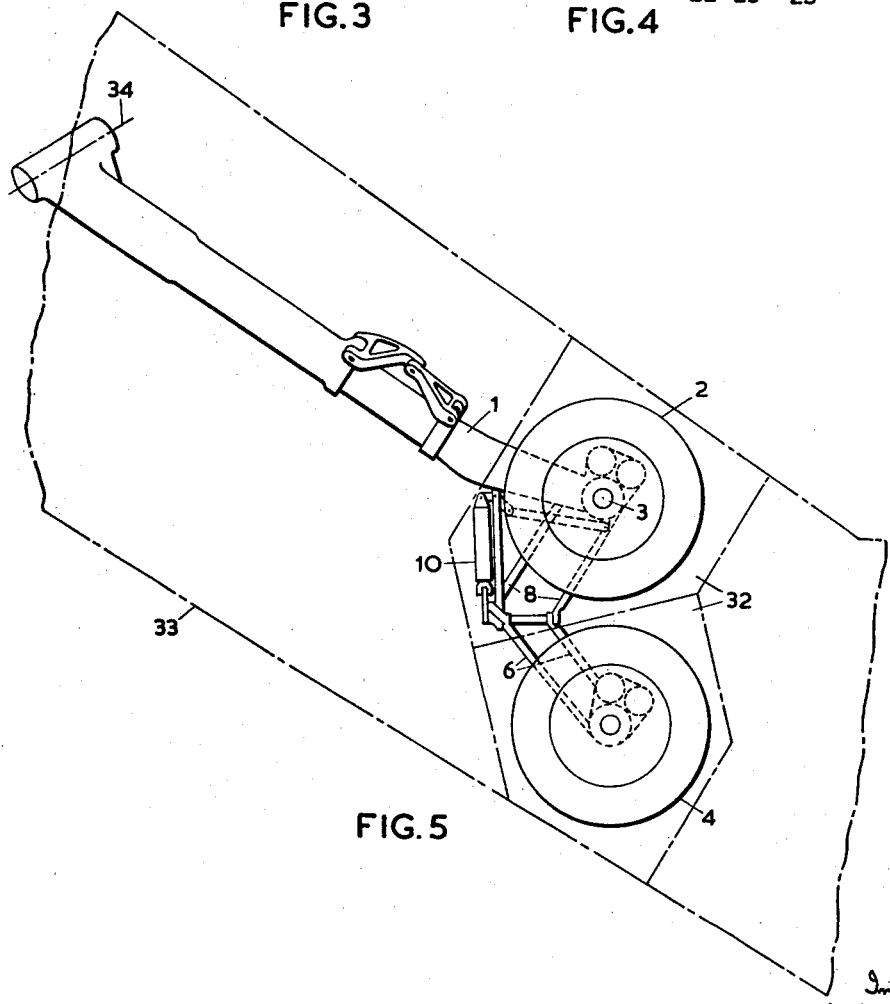
Fig. 5 shows diagrammatically an undercarriage leg with the wheels in a tandem-like position retracted in a swept-back aircraft wing, on a smaller scale.

Fig. 5 shows how the two wheels and their auxiliary structure 6, 8 fit into a well 32 provided for them in the aircraft wing 33. The undercarriage leg 1 as a whole is pivoted in the wing 33 about an axis 34.

In operation, the undercarriage is firstly retracted with the wheel 4 still locked to the leg 1 in the co-axial position (Fig. 2) in which it projects beyond the lower surface contour 30. By operation of the jack 10 firstly the locking mechanism (Figs. 3, 4) is unlocked by turning the segments 22 through 45° with respect to the segments 23. Then the toggle mechanism 13 swings the arm 6 about the jury pivot axle 7 into the position shown in Figs. 1, 2 and 5 in which the wheels 4, 2 are in a tandem-like position, and wheel 4 is completely retracted within the wing contour.

Suitably placed sequence switches ensure that the wheels are locked in the co-axial position while retraction or extension of the main undercarriage leg takes place.

What I claim as my invention and desire to secure by Letters Patent, is:

An aircraft undercarriage adapted to be retracted into a thin wing, comprising in combination: an undercarriage leg retractably mounted on the aircraft wing, a fixed structure extending in the fore-and-aft direction from said leg, an auxiliary structure pivotally mounted on the said fixed structure eccentrically to the said leg, an aircraft wheel journalled on the said leg, an aircraft wheel journalled on the said auxiliary structure and remote control and locking means adapted to turn the said auxiliary structure relative to the said leg and to lock it thereto in a ground position in which the said two wheels are co-axially positioned side by side, and in a retracted position in which the said fixed and auxiliary structure lie substantially in a common plane and the said two wheels lie one behind the other in a quasi-tandem arrangement.

References Cited in the file of this patent

FOREIGN PATENTS 718,047     Germany _____ Feb. 28, 1942